United States Patent
Breuer (10) Patent No.: US 9,844,016 B2
(45) Date of Patent: Dec. 12, 2017

(54) METHOD OF DETECTING A JAMMING TRANSMITTER AFFECTING A COMMUNICATION USER EQUIPMENT, DEVICE AND USER EQUIPMENT AND SYSTEM WITH THE USER EQUIPMENT

(71) Applicant: GEMALTO M2M GMBH, München (DE)

(72) Inventor: Volker Breuer, Bötzow (DE)

(73) Assignee: GEMALTO M2M GMBH, Munich (DE)

( * ) Notice: Subject to any disclaimer, the term of this patent is extended or adjusted under 35 U.S.C. 154(b) by 325 days.

(21) Appl. No.: 14/353,649

(22) PCT Filed: Nov. 16, 2012

(86) PCT No.: PCT/EP2012/072907
§ 371 (c)(1),
(2) Date: Apr. 23, 2014

(87) PCT Pub. No.: WO2013/072493
PCT Pub. Date: May 23, 2013

(65) Prior Publication Data
US 2014/0293821 A1 Oct. 2, 2014

(30) Foreign Application Priority Data
Nov. 18, 2011 (EP) .................................... 11189843

(51) Int. Cl.
*H04W 24/00* (2009.01)
*H04W 56/00* (2009.01)
(Continued)

(52) U.S. Cl.
CPC ...... *H04W 56/0095* (2013.01); *H04B 1/7083* (2013.01); *H04B 1/7097* (2013.01);
(Continued)

(58) Field of Classification Search
CPC ....... H04W 56/0095; H04K 3/22; H04J 13/00
See application file for complete search history.

(56) References Cited

U.S. PATENT DOCUMENTS 6,229,998 B1   5/2001   Hamdy et al.
RE42,827 E  *  10/2011  Moon .................. H04B 1/7083
                                                    370/335
(Continued)

FOREIGN PATENT DOCUMENTS

FR      2 918 828 A1      1/2009
WO      WO 00/62437 A1    10/2000
(Continued)

OTHER PUBLICATIONS

International Search Report (PCT/ISA/210) dated Jan. 30, 2013, by the European Patent Office as the International Searching Authority for International Application No. PCT/EP2012/072907.
(Continued)

*Primary Examiner* — Rhonda Murphy
(74) *Attorney, Agent, or Firm* — Buchanan Ingersoll & Rooney PC (57) ABSTRACT

A method of detecting a jamming transmitter includes the steps of indicating that a communication user equipment is capable of communicating in a cellular code division multiple access based radio network; testing a match of a uniform synchronization signal sequence of a synchronization channel; detecting a power indicator indicative of an unbiased wide band power of a received radio signal strength and comparing the power indicator to a noise floor threshold; and indicating a jamming affection of the communication user equipment in the case where (i) the communication indication is on hold; and (ii) the uniform synchronization sequence of the synchronization channel is not matched in the test, and (iii) the power indicator exceeds the noise floor threshold.

11 Claims, 5 Drawing Sheets

(51) Int. Cl.
  *H04B 1/7083* (2011.01)
  *H04B 1/7097* (2011.01)
  *H04K 3/00* (2006.01)
  *H04J 13/00* (2011.01)

(52) U.S. Cl.
  CPC ............... *H04J 13/00* (2013.01); *H04K 3/22* (2013.01); *H04B 2201/70724* (2013.01); *H04K 2203/16* (2013.01)

(56) References Cited

U.S. PATENT DOCUMENTS

| | | | |
|---|---|---|---|
| 8,054,861 B2* | 11/2011 | Sriram | H04B 1/70735 370/310 |
| 2007/0224963 A1 | 9/2007 | Moscovitz et al. | |
| 2012/0170754 A1 | 7/2012 | Girard et al. | |

FOREIGN PATENT DOCUMENTS

| | | |
|---|---|---|
| WO | WO 2005/112321 A1 | 11/2005 |
| WO | WO 2007/019814 A1 | 2/2007 |

OTHER PUBLICATIONS

Written Opinion (PCT/ISA/237) dated Jan. 30, 2013, by the European Patent Office as the International Searching Authority for International Application No. PCT/EP2012/072907.

"Universal Mobile Telecommunications System (UMTS); Requirements for support of radio resource management (FDD) (3GPP TS 25.133 version 7.14.0 Release 7); ETSI TS 125 133", ETSI Standard, European Telecommunications Standards Institute (ETSI), Mar. 1, 2009, vol. 3-R4, No. V7.14.0.

* cited by examiner

METHOD OF DETECTING A JAMMING TRANSMITTER AFFECTING A COMMUNICATION USER EQUIPMENT, DEVICE AND USER EQUIPMENT AND SYSTEM WITH THE USER EQUIPMENT

The present invention relates to a method of a jamming transmitter affecting a communication user equipment according to the preamble part of claim 1. The present invention also relates to a device configured to execute said method and a system of the device with the user equipment with interfaces to the user equipment and with an application configured to execute said method.

Contemporary cellular radio networks known since many years are now meanwhile based on different technologies. The broadest coverage still is held by the global system for mobile communications according to the so called GSM standard. A user equipment in such cellular network can move freely and may be handled over to various cells of the GSM networks as for instance described in GSM standard specification 3GPP ETSI TS 51.010 or the like.

Contemporary radio networks are based on a cellular code division multiple access CDMA as for instance realized in the universal mobile telecommunication system UMTS. Networks implementing these standards are increasingly important for security applications like camera systems or the like.

Generally, a user equipment in radio networks can be subject of being affected by a jamming transmitter—jamming in this context generally is performed by an instrument preventing a user equipment from receiving signals from its base station. In use the jammer effectively disables cellular phones mostly by broad frequency interference with communication frequencies of the user equipment at high power level. Whereas some jammer applications are meant to be legal for instances in places where phone call is to be suppressed due to silence conditions. Other jammers are applied during misuse for instances to interrupt security applications of user equipment or the like. Jammers are available for jamming GSM and also UMTS frequencies. However, jamming detecting and preventing solutions are known up to date basically only against GSM jammers. In this regard, it should be recognized that primary aim of an anti-jamming solution is to undoubtedly detect a jamming attack; however, it is also desirable to prevent the same.

In WO2005/112321 a method for jamming detection in a GSM mobile telecommunications network is described comprising the steps of, at a user equipment registered with the mobile telecommunications network: a) measuring a signal power level in at least one of a plurality of communication channels between the user equipment and a base station within a band of operation of the mobile telecommunications network; b) checking whether the signal power level in said at least one communication channel is greater than a threshold MNPL and, if so, attempting to decode a Base Station Identity Code BSIC broadcast by the base station in said communication channel; c) repeating steps a) and b) for a certain number of channels; d) signaling a jammed condition report JDR message to the base station if said BSIC cannot be decoded for said number DCMN of channels. This method suffers from the fact that usually a signaling of a jammed condition report JDR message to the base station is not possible due to the jammed condition; thus the jammed condition remains unanswered.

An anti-jamming solution is known from WO 2007/019814 which however also is restricted to the GSM standard. Therein a method for detecting a jamming transmitter affecting a communication terminal is described wherein receipt radio channel signal levels are evaluated at periodic intervals on a signaling channel. In the case that the communication terminal detects a radio channel signal level that exceeds a predefined threshold value in the signaling channel but is nevertheless unable to decode a message content of a message, then this state is interpreted as an interference state and an alarm signal is emitted. The problem related with this GSM anti-jamming solution is its fundament on a predefined threshold value in the signaling channel and the receipt of a message content. These features are somewhat specific for the GSM technology, however, less suited in the UMTS technology. More specifically it turns out that an anti jamming solution in the frame of a cellular code division multiple access based radio network is much more demanding. The state of dealing with disturbances in a communication frequency band of a user equipment is more or less a usual state of operation for a user equipment within a cellular code division multiple access based radio network. In particular, intracell and intercell interferences are generally accepted in a CDMA based radio network as long as a signal can be decoded. Thus, the state of operation naturally is permanently disturbed due to the CDMA based technology.

The specific reason is as follows. A communication user equipment UE and a number of base node stations BNS are the basic components of a CDMA based radio network. The radio network RN may work in either a frequency division duplex FDD or also a time division duplex TDD mode. Once a communication link in a serving cell coverage area is provided between the communication user equipment and a serving base node station sBNS a communication signal unit SU is correlated with a pseudonoise spread code SC in a serving cell coverage area CA of a serving base node station and transmitted as a pseudonoise chip CHI in a multiple shared communication frequency channel. Thus, interferences of multiple base node stations and user equipments in the communication frequency channel are spectrally located between an upper frequency and a lower frequency of a communication frequency band. Consequently, a broad band "jamming like" interference in the multiple shared communication frequency channel can not be considered as an extraordinary event but is on the contrary part of the usual state of operation. Such situation may also occur each time the number of users changes in said frequency band. The similar situation may also occur when a user equipment has a comparatively large or a comparatively small distance to a base node station. Also a similar situation may occur when a user equipment is in the reach of two base node stations in particular vice versa when two user equipments belong to the same or neighbouring cells of the CDMA based radio network. In conclusion, an anti-jamming solution to be successfully implemented in a CDMA based radio network technology is more sophisticating.

In WO 00/62437 a concept for improving jammer detection sensitivity in a CDMA based communication network is provided wherein spectral analysis data are used to identify jamming signals having power spectral density characteristics which are distinguishable from those of legitimate subscriber transmissions in the wireless system's frequency band. By using several base stations located near the jamming transmitter, and by comparing the power spectral densities received at those base stations, the location of the jamming transmitter is estimated. Additionally, such spectral analysis data is used to detect aberrant receive spectrum characteristics which may indicate a hardware malfunction or failure. The spectral analysis uses a model of a real-inputdata FFT and complex-input-data FFT for a CDMA signal bandwidth C of approximately 1.25 MHz and is based on the assumption that a jammer detection threshold will be set relative to a "noise floor", and it can be concluded that the jammer detection threshold will be the same for the two cases of a FFT. The (in-band) power spectral density P will be the same for either technique, with the power spectral density equaling P/C. But because the jammer power divided equally between a I and a Q branch, the jammer power will be 3 dB less for the real-input-data FFT than in the case of the complex-input-data FFT.

Nevertheless, generally and as compared to the above mentioned GSM solution of WO 2007/019814 and WO2005/112321 a predefined threshold value for a signal level of a specific signalizing channel for a user equipment per se cannot be defined. Either the channel and/or the signal level is continuously changing depending on the surroundings of the network. Also, a message content as such can not be received unless a pseudonoise spread code is received by the communication user equipment. Consequently, without pseudonoise spread code neither transmission nor a content of a message is possible unless—the pseudonoise spread code is known to the user equipment.

In 3GPP TS 25.133 in Chapter 4.2.2.1 a measurement and evaluation of cell selection criteria S of a serving cell is described, wherein the user equipment shall measure the CPICH Ec/Io and CPICH RSCP level of the serving cell and evaluate the cell selection criterion S defined in 3GPP TS 25.304 ("UE Procedures in Idle Mode and Procedures for Cell Reselection in Connected Mode"). After a certain period a user equipment is considered to be out "of service area" and shall perform actions according to 3GPP TS 25.331 ("RRC Protocol Specification"). On transition of the user equipment to another cell and if a user equipment cannot find a suitable UTRA cell, then it is considered to be "out of service area" and shall perform actions according to 3GPP TS 25.331. Thus, in principle, if no suitable cell according to its power level is found, the user equipment shall be considered to be out of service. This procedure demands for measuring one or more power levels.

Although a jamming-detection concept can be advantageously also be based identifying contents of messages or on measuring power levels, primarily it is desirable to have an anti-jamming concept which is less dependent on sophisticated measurement of signal strength or power and thus is more reliable. In particular in a CDMA based radio network decoding and despreading procedures have to be taken into account when a comparison of power levels is taken as a basis for a jamming-detection and could be avoided.

This is where the invention comes in, the object of which is to provide an effective and reliable method and device for detecting a jamming transmitter affecting a communication user equipment wherein the communication user equipment and a number of base node stations are adapted to be components of a cellular code division multiple access based radio network like for instance frequency division duplex or time division duplex mode radio network. It is still another object of the invention to provide such method and device with a more elaborated anti-jamming concept allowing also detection of a jamming transmitter on a broad frequency range. In particular it is an object of the invention to provide an effective and reliable method and device for detecting a jamming transmitter affecting a communication user equipment and while nevertheless being less dependent on sophisticated measurement of signal strength or power.

As regards the method, the object is achieved by the method of the invention as claimed in claim 1.

As regards the device, the object is achieved by particular preferred development of the user equipment as claimed in claim 15. The detection device has a power indicator detection unit, a matching filter for a uniform synchronization signal sequence of the synchronization channel SCH and setting unit for setting the communication indicator.

As regards the device, the object is achieved by particular preferred development of the system as claimed in claim 16. Therein a communication user equipment UE is adapted for communication with a component of a cellular radio network RN having a number of user equipments UE and a number of base node stations BNS, and wherein the cellular radio network RN provides a synchronization channel SCH for synchronization of the user equipment UE to a cell of the cellular radio network RN, and wherein the detection device is provided in the neighborhood or part of the user equipment.

Preferably said communication user equipment UE and a number of base node stations BNS are components of a cellular code division multiple access CDMA based radio network RN, in particular in a frequency division duplex FDD or time division duplex TDD mode, wherein a pseudonoise spread code SC is for spreading a communication signal unit SU and a synchronization of the user equipment UE to a cell of the cellular radio network (RN) is determined during a cell search from a synchronization channel, adapted to indicate, in particular to an application layer, that a jamming transmitter is affecting the communication user equipment.

The method and developed configurations thereof as outlined above may be implemented by digital circuits of any preferred kind, whereby the advantages associated with the digital circuits may be obtained. In particular one or more method steps or features of the method can be implemented by one or more means for functionally executing the method step. A single processor or other unit may fulfil the functions of several means recited in the claims—this in particular holds for a user equipment according to the concept of the invention.

The invention starts from the consideration that the user equipment per se and without further measures cannot distinguish between a normal mode frequency disturbance due to interferences originating from the CDMA system as outlined in the introduction on the one hand and a loss of service availability due to external disturbing factors which in the specific situation usually cannot be fixed. Basically for detecting a jamming transmitter affecting a communication user equipment and while nevertheless being less dependent on sophisticated measurement or comparison of signal strength or power the invention provides an alternative concept for nevertheless actively and reliably detecting a jamming situation.

According to the invention the method comprises the steps of:
  indicating that the communication user equipment UE is capable of communicating in a cellular code division multiple access CDMA based radio network RN by means of a communication indicator;
  testing a match of a uniform synchronization signal sequence of the synchronization channel SCH for detecting of the synchronization channel;—detecting a power indicator (UTRA carrier RSSI) indicative of an unbiased wide band power of a received radio signal strength and comparing the power indicator to a noise floor threshold.

Thus, uncertainties which may arise from signal strength or power measurements—apart from the suggested rather simple indication of an unbiased wide band power of a received radio signal strength and comparing the power indicator to a noise floor threshold—are omitted in the alternative concept of the instant invention.

The invention further recognized that a Boolean statement, i. e. a YES- or NO-statement, with regard to a jamming situation can be based on the detectability of the synchronization channel. In a cellular radio network a synchronization of the user equipment to a cell of the cellular radio network is determined wherein the cellular radio network RN provides a synchronization channel SCH for synchronization of the user equipment UE to a cell of the cellular radio network RN. In a cell search e.g., i.e. in a search for a synchronization channel, one of the basic prerequisites is, that—usually—a synchronization channel is transmitted from a base node station (i. e. in a downlink) in sufficient signal strength, namely such that the synchronization channel is detectable reliably. This usually is the case even in a rather strong multipath environment. The reason basically is that a synchronization channel is to be detected well before a pseudonoise spread code can be identified. In other words detectability of a synchronization channel is a prerequisite for identifying a pseudonoise spread code. The invention suggests testing a match of a uniform synchronization signal sequence of the synchronization channel SCH for detecting of the synchronization channel. Thus, a verification that a synchronization channel cannot be received is sufficient to indicate that a jamming transmitter is affecting the communication user equipment. The concept is based on the fact that in principle a synchronization channel can always be determined, i. e. that sufficient energy is received to determine a synchronization channel in principle, once it can be assumed that the communication user equipment UE is capable of communicating in a cellular code division multiple access CDMA based radio network RN; the invention is based on a corresponding indication.

Consequently, when a user equipment is jammed while camping on a cell the user equipment will not be able anymore to decode the pseudonoise spread code. Camping means that the user equipment has completed the cell selection/reselection process and has chosen a cell from which it plans to receive all available services; i. e. the pseudonoise spread code has been decoded. However, as a user equipment still will determine some energy or power (namely the jamming power) in the cell the user equipment will try to receive the pseudonoise spread code in a common pilot channel CPCH usually or any other common channel of that cell depending on the kind of the cellular radio network. Thus, the user equipment will initiate a cell search wherein the user equipment searches for a cell in order to determine the pseudonoise spread code (also referred to as a downlink spreading code) and a common channel time frame synchronization for the cell. However, according to the recognition of the invention, at least a maximum path synchronization channel should be detectable. An exemplifying detection for the initial synchronization and detection of a primary synchronization channel PSCH by matched filter can be found as described e. g. per 3GPP TS25.214 Annex C (informative). According to the invention it can be concluded that a jamming situation is affecting the user equipment already at an early stage of synchronization when a synchronization channel can not be received in this situation.

The invention suggests, that a jamming affection of the communication user equipment is indicated, in the case
the communication indicator is set; and
the uniform synchronization signal sequence of the synchronization channel SCH is not matched in the test, and
the power indicator exceeds the noise floor threshold.

In the alternative, the user equipment UE is synchronized to a cell of the cellular radio network RN, in the case the synchronization channel SCH is detected.

Preferably each of the jamming affection conditions is indicated by a Boolean value. The concept of the invention is advantageously simple as it is based on a Boolean statement of detectability of the synchronization channel and a indication of communication capability. Sophisticated comparisons of power levels are avoided; the invention uses a simple noise floor threshold test which has to be understood rather broad as any check that a signal is detectable at all. E.g. also in a first term of time the step can be executed:
detecting a first power indicator (UTRA carrier RSSI) indicative of an unbiased wide band power of a received radio signal strength; and
in a second term of time the step can be executed:
detecting a second power indicator (UTRA carrier RSSI) indicative of an unbiased wide band power of a received radio signal strength and wherein the second power indicator is compared to the first power indicator, and
a jamming affection of the communication user equipment is indicated, in the case further: the second power indicator exceeds the first power indicator.

In a particular preferred development a power indicator is determined indicative of a received radio signal strength in a radiofrequency bandwidth of the antenna of the communication user equipment. Advantageously, in the case it is verified that the power indicative of a received signal strength is exceeding a noise level, it can be indicated that a jamming transmitter is affecting the communication user equipment when also the above-mentioned synchronization channel cannot be received. The additional condition that a power indicator is indicative of a received radio signal strength exceeding a noise level makes sure that indeed the user equipment is capable of receiving power. Thus, although the concept of the invention is independent of detecting a power indicator; nevertheless, it is advantageous to at least make sure that a power can be measured at all. Advantageously also, the development avoids a comparison of power levels for different points of time.

These and other developed configurations of the invention are further outlined in the dependent claims. Thereby, the mentioned advantages of the proposed concept are even more improved.

Preferably an indication of a jamming affection of the communication user equipment is suppressed, in the case the communication user equipment UE is capable of communicating in a cellular radio network RN other than a cellular code division multiple access CDMA based radio network RN, in particular a GSM network. Thereby it is advantageously excluded that the uniform synchronization sequence of the synchronization channel SCH is not matched in the test only because the user equipment is connected in another network; thus a developed method of this kind is more reliable.

The synchronization channel SCH is a primary synchronization channel P-SCH for identifying onset of a radio frame, in particular wherein one matching filter for a uniform synchronization signal sequence of the primary synchronization channel P-SCH is provided.

The synchronization channel SCH is a secondary synchronization channel S-SCH for identifying onset of a slot of a radio frame, in particular wherein for each of a number, in particular fifteen, of matching filters for a uniform synchronization signal sequence of a slot of the a radio frame of the secondary synchronization channel S-SCH is provided.

Generally the communication indication is meant to make sure that the user equipment at all is in a situation to detect a CDMA based network; developments of the concept of the invention may rely on various kinds of indications. Preferably the communication indication can be user defined, in particular in a setting procedure. This may be advantageous for a stationary version of a user equipment and can avoid further comparison steps; thus can based on a Boolean absolute setting of a user.

Alternatively the communication indication can automatically be defined—e.g. the user equipment or an application layer—in particular regularly. This may be advantageous for a mobile version of a user equipment; preferably this development may rely on further relations to compensate for a change of location of a mobile user equipment. E. g. the communication indication comprises preferably indicating that the UE is in a CDMA based radio network coverage area.

Particular preferred is a "relative" communication indication comprising that the user equipment has already camped on a cell of a CDMA based radio network at an earlier point of time.

Preferably in a first term of time, in particular during a start up phase, the steps are executed:
 detecting a synchronization channel SCH for synchronization of the user equipment UE to a cell of the cellular radio network RN during a cell search by matching of the uniform synchronization sequence,
 receiving a pseudonoise spread code SC for spreading a communication signal unit (SU),
 in particular, communicating in a cellular code division multiple access CDMA based radio network RN.

Particular preferred, the cellular radio network RN is a cellular code division multiple access CDMA based radio network RN adapted for transmitting a signal comprising multiple communication signal units SU between the communication user equipment UE and a serving base node station sBNS, in particular in a frequency division duplex FDD or time division duplex TDD mode, wherein:
 a communication signal unit SU is correlated with the pseudonoise spread code SC in a serving cell coverage area CA of the serving base node station sBNS and transmitted as a pseudonoise chip CHI in a multiple shared communication frequency channel spectrally located between an upper frequency and a lower frequency of a communication frequency band FB I-XIX, and wherein
 the pseudonoise spread code SC is a downlink spreading code and a synchronization of the user equipment UE to the serving cell is determined during a cell search from a synchronization channel.

Preferably in the communication link the pseudonoise spread code SC is received by the communication user equipment UE as a serving pseudonoise spread code sSC from said serving base node station BNS in a serving downlink channel sCPICH.

In a particular preferred development indicating that the communication user equipment UE is capable of communicating in a cellular code division multiple access CDMA based radio network RN, comprises one or more of:
 indicating that a synchronization channel SCH has been detected,
 indicating that a pseudonoise spread code SC has been received,
 indicating that a communication has been performed.

Preferably in a second later term of time the steps are executed:
 testing a match of a uniform synchronization signal sequence of the synchronization channel SCH for detecting of the synchronization channel;
 detecting a power indicator (UTRA carrier RSSI) indicative of an unbiased wide band power of a received radio signal strength and comparing the power indicator to a noise floor threshold.

A "relative" communication indication thus can be easily implemented in usual stack processes of running a user equipment.

Preferably the communication indication comprises indicating a number of UTRA carrier frequencies, in particular comprises indicating a uniform synchronization signal sequence of the synchronization channel SCH for each of the number of UTRA carrier frequencies. Generally, the received radio signal strength can be a signal strength of a communication frequency channel spectrally located between an upper frequency and a lower frequency of a communication frequency band, that is a frequency band denoted FB I to FB XIX; as outlined in the standard a band having a UTRAFCN (universal terrestrial radio network frequency channel number). Thus, the instant concept can be improved by being performed on one of the bands or channels as listed in the UTRAFCN list. Testing a match of a uniform synchronization signal sequence of the synchronization channel SCH for detecting of the synchronization channel can be performed for any, in particular all, of these communication frequency channels. Preferably testing a match of a uniform synchronization signal sequence is done for every 5 MHz-band or at least one acute 5 MHz-band, preferably also neighboring bands. Preferably testing a match of a uniform synchronization signal sequence is done in a band 2110-2170 MHz including the twelve 12 UMTS-minibands therein. In particular in the case it is verified that the power indicator is indicative of a received radio signal strength exceeding the noise level, in particular exceeding a maximum level (maxpath), in that communication frequency channel and/or band, and a synchronization channel SCH cannot be received for that communication frequency channel and/or band, then it is indicated that a jamming transmitter is affecting the communication user equipment in that communication frequency channel and/or band.

Preferably the test comprises a predetermined number of matching attempts for a sequence of radio frames and wherein the uniform synchronization sequence is not matched in the test when a coherent average of the matching attempts is not matched. The number of matching attempts is preferably larger than one but preferably also limited to less than ten, preferably less than five; advantageous are three matching attempts. The reason is that in the synchronization procedure the frequency is not locked yet and also may change due to Doppler-effects between the user equipment and the base node station; thus this also may average out a coherent average of the matching attempts if the number is too large. Preferably the uniform synchronization sequence of the synchronization channel SCH is not matched in the test when the synchronization channel SCH cannot be received in the case three synchronization channel peaks repeatedly cannot be detected, in particular repeatedly cannot be detected from a primary synchronization channel P-SCH. The synchronization channel peaks preferably each have a distance of 2560 chips, +/−0.5 chips.

In a particular preferred development, it can be verified that the power indicator is indicative of a received radio signal strength for the strongest path (maxpath) in that communication frequency channel. This consequently follows the concept of the invention wherein it is assumed that at least the maxpath synchronization signal shall be detectable in a coverage area of a base node station. Availability of a maximum path signal is identified, in particular by checking an SCH-Ec/Io-parameter and the match of a uniform synchronization signal sequence of the synchronization channel SCH for detecting of the synchronization channel is preferably tested with a maximum path synchronization signal sequence.

A power indicator can be generally any RSCP parameter (received single code power parameter) but preferably is a wide band power like RTWP. Generally also a power parameter can be formed by any other parameter like for instance an absolute indicator (dBm) or relative power indicator Ec/Io. E.g. a power indicator RSSI is adapted for the synchronization channel SCH_Ec, SCH_Ec/Io, in particular is adapted for a maximum power synchronization channel SCH_maxpath.

In a particular preferred development the concept of the invention is approved to indicate a jamming situation specific to a channel and/or specific to a band. Thus, it can be indicated that a jamming transmitter is affecting the communication user equipment in that communication frequency channel and/or communication frequency band, in the case it is verified that the power indicator is indicative of a received radio signal strength exceeding the noise level in that communication frequency channel and/or band and additionally a synchronization channel can not be received for that communication frequency channel and/or in that communication frequency band.

Nevertheless, it is advantageous to verify that a synchronization channel cannot be received from any of the serving base node stations. This makes sure that the jamming situation is identified wherein a broad band jammer affects the user equipment.

In a particular preferred development it is excluded that the band or channel selected arises from another mobile standard (like foreign stance GSM or the like). In this case it is preferred to indicate that a jamming transmitter is affecting a communication user equipment in the case that a synchronization channel can not be received for a communication frequency channel and/or in a communication frequency band wherein a synchronization channel has been received before the verifying step for that communication frequency channel and/or in the communication frequency band.

A power indicator is considered as any indicator significant for a power. This, of course comprises a physically measurable power quantity itself, but also comprises any other value which is of use to denote quantitatively the power quantity. In particular the indicator not necessarily needs to have the metric unit of a power but can be a dimensionless quantity, in particular a ratio or logarithmic or bit-value or other value, which is suitable to quantitatively describe the physical power quantity.

In particular the meaning of power is to be understood broadly and also comprises the meaning of energy. A preferred understanding of power is power spectral density PSD according to the standard, whereas the units of power spectral density PSD is extensively and of broader use in this application. Generally a PSD is a function of power versus frequency and when integrated across a given bandwidth (like a channel e.g.); the function represents the mean power in such a bandwidth. When the mean power is normalised to (divided by) the chip-rate it represents the mean energy per chip. Some signals according to the standard are directly defined in terms of energy per chip, DPCH_Ec, Ec, OCNS_Ec and S-CCPCH_Ec and others defined in terms of PSD (Io, Ioc, Ior and Îor). There also exist quantities that are a ratio of energy per chip to PSD (DPCH_Ec/Ior, Ec/Ior etc.). This is the common practice of relating power and energy or the like magnitudes in communication systems. It can nevertheless be seen that if both energy magnitudes in the ratio are divided by time, the ratio is converted from an energy ratio to a power ratio, which is more useful from a measurement point of view. It follows that an energy per chip of X dBm/3.84 MHz can be expressed as a mean power per chip of X dBm. Similarly, a signal PSD of Y dBm/3.84 MHz can be expressed as a signal power of Y dBm.

In particular a jamming indication can be given to an application layer of an evaluation unit which interfaces to the user equipment. By means of the evaluation unit it is possible to provide information discriminating between a jamming situation and an out-of-service-situation. This kind of information can be signalized to a user. A user can be a person or an automatic environment like an alarm or a supervision environment, in particular in mobile entities like a car for instance. Thus, for instance a person driving a car can be warned that at a certain location no alarm or supervision function can be achieved by the user equipment be that it may be due to a jamming situation or be that it may be due to an out-of-service situation. As follow-up the information to the automatic or personalized periphery by means of the evaluation unit can be used to provide further measures which are adapted to the kind of loss of service availability. For instance other alarm or supervision functions can be activated. For instance the situation can be used to save energy by cutting off a process which is not of use in an out-of-service situation.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further the features described in the description, the drawing and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does exclude a plurality.

Figure 1:
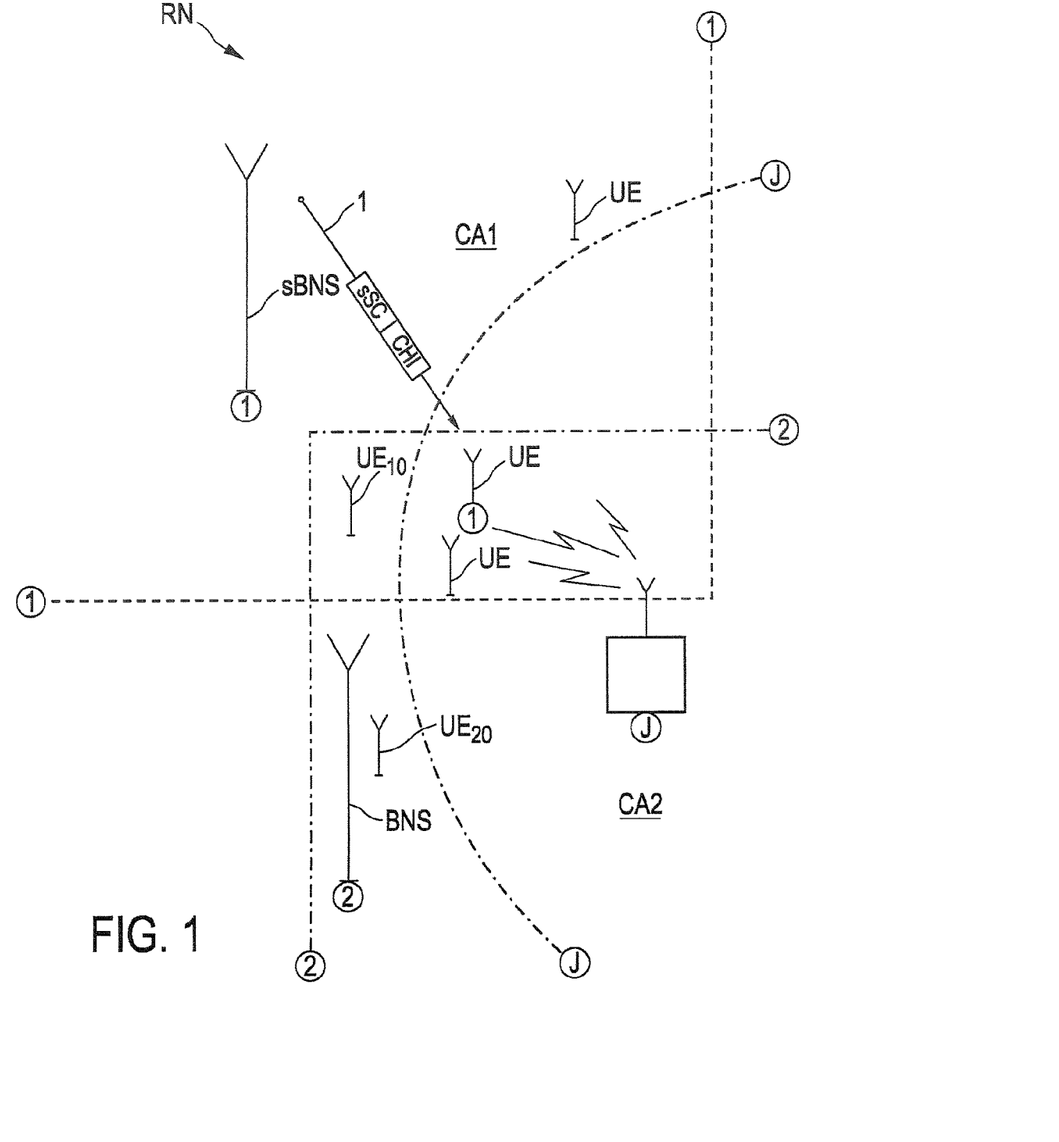
FIG. 1 shows a simplified symbolic graphic of a structure of a CDMA based radio network.

FIG. 1 shows in principle a cellular code division multiple access CDMA based radio network RN. The radio network RN allows for several transmitters—here referred to as a user equipment UE—to send information simultaneously over a single communication channel. This allows several user equipments UE to share a bandwidth of different frequencies. The CDMA based network can employ a spread spectrum technology and a special coding scheme—for instance a frequency division duplex FDD or time division duplex TDD mode can allow multiple users to be multiplexed over the same physical channel. The spread spectrum signaling has a much higher data bandwidth than the data being communicated. The CDMA based radio network RN provides a set of at least one base node station—here for instance the serving base node station sBNS and the further base node station BNS, which are within reach of the user equipment UE. For instance a communication link 1 in a serving cell #1 coverage area CA1 of the sBNS#1 is provided between the communication user equipment #1 and the assigned serving base node station sBNS#1. As the user equipment UE#1 is also in the cell coverage area CA2 of the base node station BNS#2, the base node station BNS#2 and the serving base node station sBNS#1 form an active set of base node stations, which are both in reach of the user equipment UE#1. In the present embodiment the sBNS#1 has the strongest communication link 1.

Figure 2A:
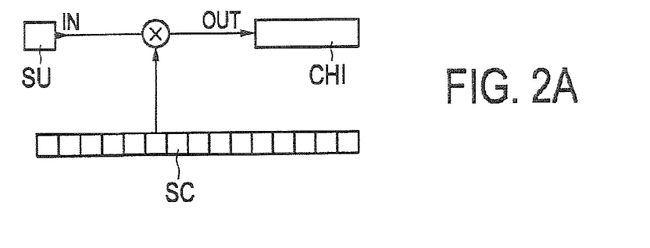
FIG. 2A is a graphic illustrating the correlation of a pseudonoise spread code SC with a communication signal unit SU to provide a pseudonoise chip CHI in a multiple shared communication frequency channel.

The communication link 1 is adapted for transmitting a signal comprising multiple communication signal units SU between the communication user equipment UE#1 and the serving base node station sBNS#1. As exemplified in FIG. 2A the communication signal unit SU forms the input of a spreading code operation, wherein the signal unit SU is correlated with a pseudonoise spread code sSC in the serving cell coverage area CA1 of the serving base node station sBNS#1. The output signal of the spreading code operation is a so called pseudonoise chip CHI formed by the spreading encryption manipulating the original signal unit SU by means of the serving spreading code sSC. This can be performed either by an additive or multiplicative spreading operation as in principle known in the art.

As a result, the pseudonoise chip CHI is transmitted in a multiple shared communication frequency channel as indicated in the communication link 1 of FIG. 1 and can be transmitted or received by the user equipment UE#1 only when the serving pseudonoise spread code sSC is known by the user equipment UE#1. Once, the spreading code SC, i.e. the pseudonoise spread code is known, a signal unit can be received or transmitted by the user equipment UE#1.

The pseudonoise spread code SC is received by the communication user equipment UE#1 as a serving pseudonoise spread code sSC as shown in FIG. 1 in a so called serving downlink channel sCPICH. The CPICH contains 20 bits of data, which are either all zeros or in the case that space time transmit diversity is employed is a pattern of alternating ones and zeros for transmissions on the sBNS second antenna. The first antenna of a base node station always transmits all zeros for a CPICH. The CPICH downlink channel has a constant power and is of a known bit sequence. Its power is usually between 5% and 15% of the total BNS transmit power. A common CPICH power is of 10% of the typical total transmit power of 43 dBm. The CPICH can be used for measurements of signal quality.

As outlined in 3GPP ETSI TS25.214 during the cell search, a user equipment UE searches for a cell and determines the downlink spreading code and frame synchronization of that cell. The cell search is typically carried out in three steps:

Step 1: Slot Synchronization

During the first step of the cell search procedure the UE uses the SCH's primary synchronization code to acquire slot synchronization to a cell. This is typically done with a single matched filter (or any similar device) matched to the primary synchronization code which is common to all cells. The slot timing of the cell can be obtained by detecting peaks in the matched filter output.

Step 2: Frame Synchronization and Code-Group Identification

During the second step of the cell search procedure, the UE uses the SCH's secondary synchronization code to find frame synchronization and identify the code group of the cell found in the first step. This is done by correlating the received signal with all possible secondary synchronization code sequences, and identifying the maximum correlation value. Since the cyclic shifts of the sequences are unique the code group as well as the frame synchronization is determined.

Step 3: Spreading-Code Identification

During the third and last step of the cell search procedure, the UE determines the exact primary spreading code used by the found cell. The primary spreading code is typically identified through symbol-by-symbol correlation over the CPICH with all codes within the code group identified in the second step. After the primary spreading code has been identified, the Primary CCPCH can be detected. And the system- and cell specific BCH information can be read.

Figure 2B:
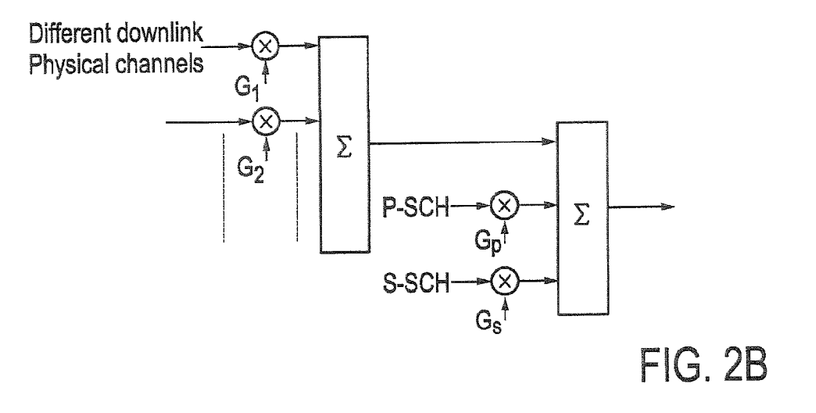
FIG. 2B is a graphic illustration of combining of downlink physical channels taken from TS25.213 Chapt. 5.1.5.

If the user equipment UE has received information about which spreading codes to search for, steps 2 and 3 above can be simplified. The P-SCH and S-SCH can be used in parallel. FIG. 2B illustrates how different downlink channels are combined. Each complex-valued spread channel may be separately weighted by a weight factor $G_i$. The complex-valued P-SCH and S-SCH, as described in FIG. 2C, may be separately weighted by weight factors $G_p$ and $G_s$. All downlink physical channels shall then be combined using complex addition. The P-SCH is unscrambled and sent at the beginning of a time slot.

Figure 2C:
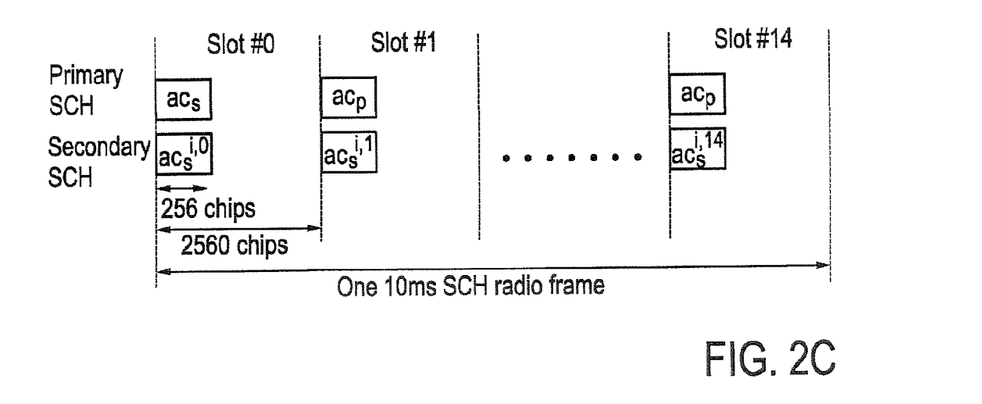
FIG. 2C is a graphic illustration of a structure of a synchronization channel taken from TS25.211 Chapt. 5.3.3.5.

FIG. 2C illustrates the structure of the SCH radio frame; i. e. the synchronization channel SCH is a downlink signal used for cell search. The SCH consists of two sub channels, the primary and secondary SCH. The 10 ms radio frames of the primary and secondary SCH are divided into 15 slots, each of length 2560 chips. The primary SCH consists of a modulated code of length 256 chips, the primary synchronization code PSC transmitted once every slot. The PSC is the same for every cell in the system. The secondary SCH consists of repeatedly transmitting a length 15 sequence of modulated codes of length 256 chips, the secondary synchronization codes SSC, transmitted in parallel with the Primary SCH. The SSC has i=0, 1, . . . , 63 numbers of spreading code groups, and k=0, 1, . . . , 14 slot numbers. Each SSC is chosen from a set of 16 different codes of length 256. This sequence on the Secondary SCH indicates which of the code groups the cell's downlink spreading code belongs to.

Generally when the user equipment is provided in a cell search modus the user equipment determines a pseudonoise spread code SC and synchronization from a synchronization channel, in particular a time slot synchronization from a primary synchronization channel of that cell. The synchronization channel SCH cannot be received in the case three synchronization channel peaks repeatedly cannot be detected, in particular repeatedly cannot be detected from a primary synchronization channel (P-SCH), in particular wherein the synchronization channel peaks each have a distance of 2560 chips, +/−0.5 chips. The reason is that in a FDD frame structure the next slot beginning in a P-SCH is 2560 chips away. With regard to the S-SCH there are 12 secondary sequences. Each succession of three S-SCH sequences is unique in a FDD structure and leads to exactly one of 64-code groups. Each code group comprises a succession of S-SCH-sequences from 1 to 15 of all slots of a frame. Therefore the beginning of a frame is known as e.g. shown in Table 4 of TS 25.213.

Thus a UE searching for a CDMA Node B will first use the primary and secondary synchronization channels P-SCH and S-SCH respectively to determine the slot and frame timing of a candidate P-CCPCH, whether STTD is in use, as well as identifying which one of 64 code groups is being used by the cell. Crucially this allows the UE to reduce the set of possible Primary Spreading Codes being used for P-CPICH to only 8 from 512 choices. At this point the correct PSC can be determined through the use of a matched filter, configured with the fixed channelization code $C_{ch,256,0}$, looking for the known CPICH bit sequence, while trying each of the possible 8 PSCs in turn. The results of each run of the matched filter can be compared, the correct PSC being identified by the greatest correlation result. An example is given in TS 25.214 chapter 5.5. Once the spreading code for a CPICH is known, the channel can be used for measurements of signal quality, usually with RSCP and $E_c/I_0$ as will be shown below. Timing and phase estimations can also be made, providing a reference that helps to improve reliability when decoding other channels from the same Node B.

In the instant embodiment, a jammer affects the user equipment UE#1 by interfering with the multiple shared communication frequency channel as located in a communication frequency band. Frequency bands FBI to FBIXX are known, each having a bandwidth of approximately 60 MHz. Each frequency band comprises several communication frequency channels, each having a bandwidth of 5 MHz. For each frequency channel, therefore the noise floor of 110 dBm can be defined based on a relative noise of 174 dBm/Hz.

In the UMTS cellular communication system, received signal code power RSCP denotes the power measured by a receiver on a particular physical communication channel. It is used as an indication of signal strength, as a handover criterion, in downlink power control, and to calculate path loss. In CDMA systems, a physical channel corresponds to a particular spreading code, hence the same.

While RSCP can be defined generally for any CDMA system, it is more specifically used in UMTS. Also, while RSCP can be measured in principle on the downlink as well as on the uplink, it is only defined for the downlink and thus presumed to be measured by the UE and reported to the Node B.

A staple power for an out of jamming region user equipment UE#10 is a piled up staple with a rather small amount of CPICH power, a larger amount of signal code power dedicated to the user equipment and a main portion of shared signal power. The latter is used by several user equipments in the same 5 MHz bandwidth of the communication frequency channel. Nevertheless, information can be retrieved for each user equipment according to the pseudonoise spread code provided by the serving base node station and also the further base node station to each of the user equipments.

Once the number of user equipments changes in a coverage area CA1 of the service base node station 1 the shared signal power may vary rather often. However, as the serving pseudonoise spread code SSC is available for the user equipment UE#10 even upon variation of the shared signal power, user equipment UE#10 can uphold the communication link to the serving base node station sBNS#1. The reason for this is that even upon variation of the shared signal power nevertheless the CPICH power can be detected by the user equipment UE#10. The CPICH power normally is located not more than 24 dBm below the upper level of the staple power. Thus, due to the spread code gain value of instantly 24 dBm CPICH power and pseudonoise spread code SC can be detected by the user equipment UE#10 during normal operation.

In the case the distance between serving base node station sBNS#1 and user equipment UE#10 is diminished like for instance the distance between sBNS#1 and UE10 the cell selection criteria power parameters Ec/Io ratio—in the standard denoted as CPICH Ec/Io as well as the received signal code power CPICH RSCP will increase—thus overall the signal quality will increase. However, in the case the distance between UE#10 and sBNS#1 is enlarged—for instance by moving to UE#20—the biased parameter Ec/Io, i.e. ratio CPIHC Ec/Io and the received signal code power CPICH RSCP of the sBNS#1 will decrease but instead of those of the BNS#2 will increase. Thus, upon a situation, the soft-handover may occur between sBNS#1 and BNS#2 by moving UE#10 to UE#20. This situation is described for instance in 3GPP TS25.133.

Distinct from those normal operation interferences in the communication frequency channels is the situation shown in FIG. 1 due to the presence of a jammer J. The presence results in a user equipment UE#1 received staple power. Additional to the CPICH power the dedicated signal code and the shared signal power a large pile of jamming power on top of the staple power of FIG. 2B is detected by UE#1. The CPICH power therefore is not anymore in the spread code gain and consequently cannot be detected anymore. This situation is to be distinguished from the out of range situation as described in TS25.133 chapter 4.2.2.1. Namely, in the presently described situation of FIG. 1 the biased parameters are not detectable whereas the unbiased parameters have increased. The increase is due to the jamming power of jammer J. In the "out of service area" situation the unbiased parameters decrease as the biased parameters also decrease.

In principle this situation can be used to detect a jamming transmitter affecting the user equipment UE#1 when also an unbiased received wideband power within the bandwidth of the communication user equipment receiver at the communication user equipment UE#1 antenna connector is measured. Upon verifying the condition that the biased parameters—namely the Ec/Io and RSCP—are not detectable and the unbiased parameter RSSI has increased a first indication of a jamming transmitter is given.

However, this demands for comparison of power levels of different points of time; namely before and after the jamming situation. According to the concept of the invention this situation can be used already to provide an effective concept of detecting a jamming transmitter affecting the user equipment UE#1 without detecting and comparing power levels.

Also, as outlined above once a CPICH and a spreading code PSC is known all user equipments will receive signals form the mainpath, but also temporally retarded received paths can also be combined (RAKE combining). At the time of identifying a P-SCH detection however only a max-path can be evaluated as temporally retarded signals cannot be distinguished from transmissions of other base stations in the nearest neighbourhood. As outlined in 3GPP ETSI TS25.133 P-SCH is a uniform sequence.

However, also the concept of the instant invention recognized that each base station will transmit a P-SCH relative to a noise-level such that the P-SCH is safely detectable even in a user equipment strong multi path environment. Thus, the embodiment shown in FIG. 4 can be based on a Boolean statement relying on a detectability of the P-SCH maxpath as the P-SCH maxpath shall be detectable practically always.

Thus—as will be apparent from the following embodiments described in FIG. 3A and FIG. 3B—a very general anti-jamming criterion can be formulated as follows:
determining a synchronization channel; and
in the case it is verified that
  (a) a synchronization channel SCH cannot be received indicating that a jamming transmitter is affecting the communication user equipment.

To make sure that the user equipment indeed is receiving a signal strength at all it is advantageous to determine a power indicator—RSSI power indicator—indicative of a received radio signal strength in a radiofrequency bandwidth of the antenna of the communication user equipment UE. In the case it is verified that
  (b) the power indicator RSSI is indicative of a received radio signal strength RTWP exceeding a noise level it is indicated that a jamming transmitter is affecting the communication user equipment.

To make sure that the user equipment indeed is in a UMTS communication modus and the received signal strength is a signal of a CDMA based radio network it is verified
  (c) whether a respective UMTS communication indicator is set.

E. g. a UMTS communication indicator can be on hold by means of a binary value stored or some setting of a user equipment which is indicative that the user equipment is capable of and in reach of a UMTS communication signal.

Figure 3A:
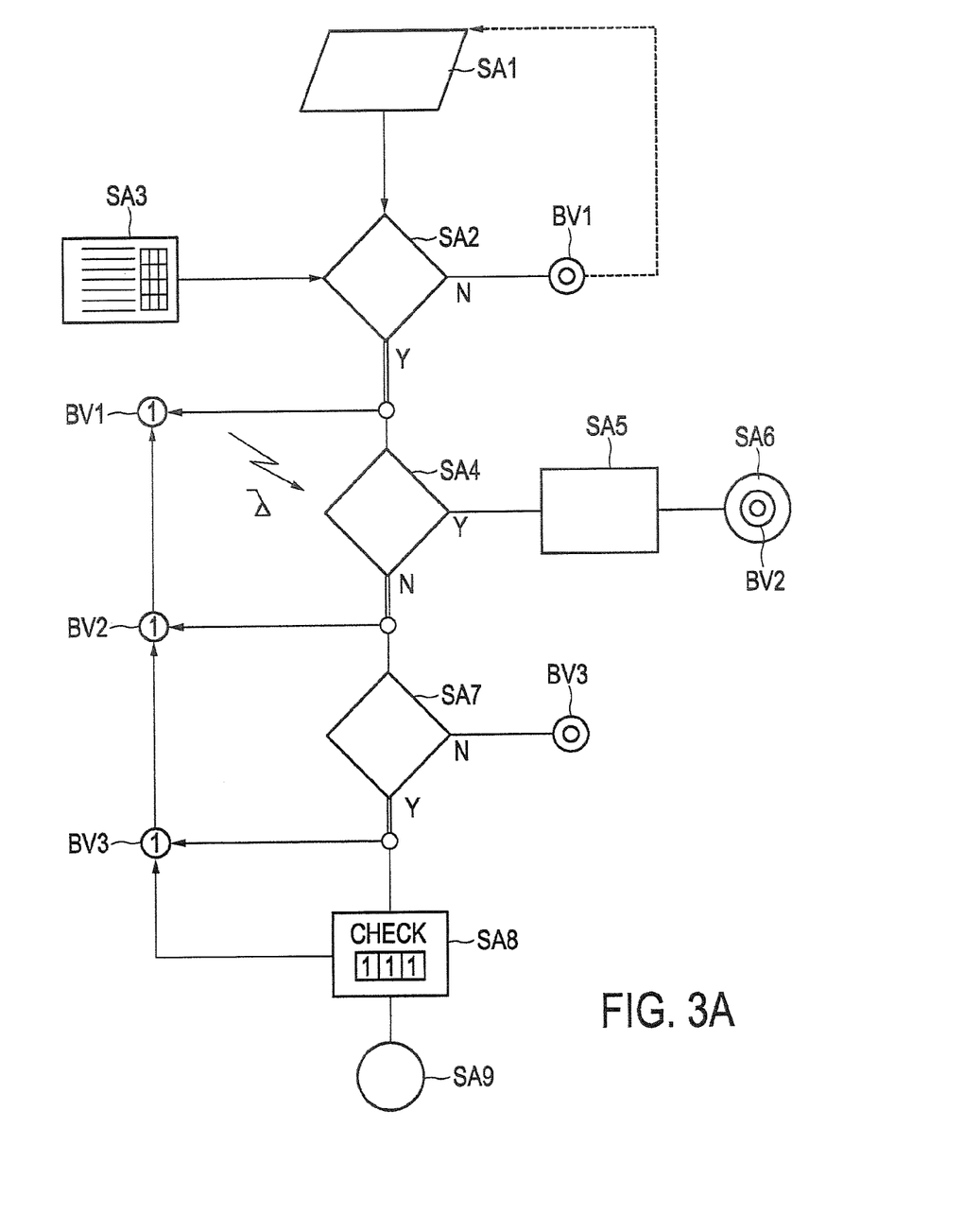
FIG. 3A, 3B shows a general (A) and specific (B) flow chart of preferred embodiments of the method.

The flow chart of FIG. 3A generally illustrates the principle sequence of method steps to make sure that a user equipment is indeed subject of a jamming attack wherein the above-mentioned conditions (a) (b) and (c) each can be achieved by means of a binary setting and a rather simple power verification. The power verification as such is not necessarily a power measurement as it is restricted to simply verify that some power above a noise floor threshold is available. Thus, the below outlined embodiment is a surely Boolean sequence of decisions and can be implemented in any kind of user equipment or module in the user equipment for detecting a jamming transmitter. Also the below outlined embodiment of a method can be implemented in a suitable device which can be provided separately from user equipment due to the rather simple conditions of the method the device can be implemented by means of rather simple secure logic and sensors. In particular, a power sensor can be adapted to simply verify some kind of existing power exceeding a noise floor threshold.

In detail the embodiment of method in FIG. 3A has a start-up sequence in step SA1 wherein a synchronization channel SCH for synchronization of the user equipment to a cell of cellular radio network during a cell charge is performed by matching of a uniform synchronization sequence. Also in step SA1 during the start-up phase usually a user equipment is camped on a cell by receiving a pseudonoise spread code SC for spreading a communication signal unit SU. Thus, communication in a cellular code division multiple access based radio network RN usually is possible after step SA1.

In step SA2 it is indicated whether the communication user equipment UEE is capable of communicating in a cellular code division multiple access based radio network. In the instant case as known from step SA1 it can be stored or set otherwise, .e.g. also by setting a flag or the like, that a synchronization channel SCH has been already detected and/or a pseudonoise spread code SC already has been received and/or that a communication in a CDMA based radio network RN already has been performed. Alternatively or additionally a user input SA3 can be used to indicate that the communication user equipment UEE is capable of communicating in the CDMA based radio network RN. Thus, be that it may from a start-up phase in step SA1 or from a user or automatic input SA3 in step SA2 an indication can be given in the YES-path that the user equipment is capable of communicating in a CDMA based radio network. Thus in the YES-path a communication indication is given by setting a binary value "1". In the NO-path the procedure ends for instance by filling a register with a binary value "0" or the process leads back to the start-up phase in step SA1.

In a further checking step SA4 a test is performed whether a match of a uniform synchronization signal sequence of the synchronization channel SCH for detecting of the synchronization channel SCH is performed. In the YES-path in step SA5 finally the synchronization channel SCH can be detected and as a result in step SA6 the user equipment is camped on a cell again.

However, in case of a jamming attack J in step SA4 a match of uniform synchronization signal sequence of the synchronization channel SCH will not be possible due to the jamming power exceeding the SCH signal power. Consequently, in case of a jamming attack J the procedure will follow up step SA4 in the NO-path and a register information can be set by setting a binary value "1". In summary, in case of a jamming attack J the register will already filled with two binary values "1". The first binary BV1 will indicate that a communication indication is set. The second binary value BV2 will indicate that a test of match was unsuccessful. A test of match in principle can be executed in various forms however advantageously can follow the standardized steps as outlined in claims 4 and 5 in particular. Namely, the test advantageously comprises a predetermined number of matching attempts for a sequence of radio frames wherein the uniform synchronization sequence is not matched in the test when the coherent average of the matching attempts is not matched. For realizing a coherent average the synchronization channel test can be performed by trying to receive free synchronization channel peaks repeatedly. In the case is the free synchronization channel peaks cannot be detected from a primary synchronization channel PSCH each having a distance of 2560 chips, +/−0.5 chips in step SA4 the binary BV2 in the NO-path will indicate that the test has been unsuccessful.

In step SA7 the simple power module can verify that a power indicator like a RSSI or RTWP value for an unbiased wide band power of a received radio signal strength in a radio frequency band width of the antenna of the communication user equipments exceeds the noise floor threshold. Thus, in the case some signal can be detected the resulting answer following up step SA7 will be in the YES-path and provide a binary value BV3 in the register "1".

In step SA8 the register is retrieved by checking the three binary values BV1 and BV2 and BV3. In the case all three binary values BV1, BV2, BV3 are "1" in step SA9 an indication of jamming affection of the communication user equipment can be given to an application layer.

Figure 3B:
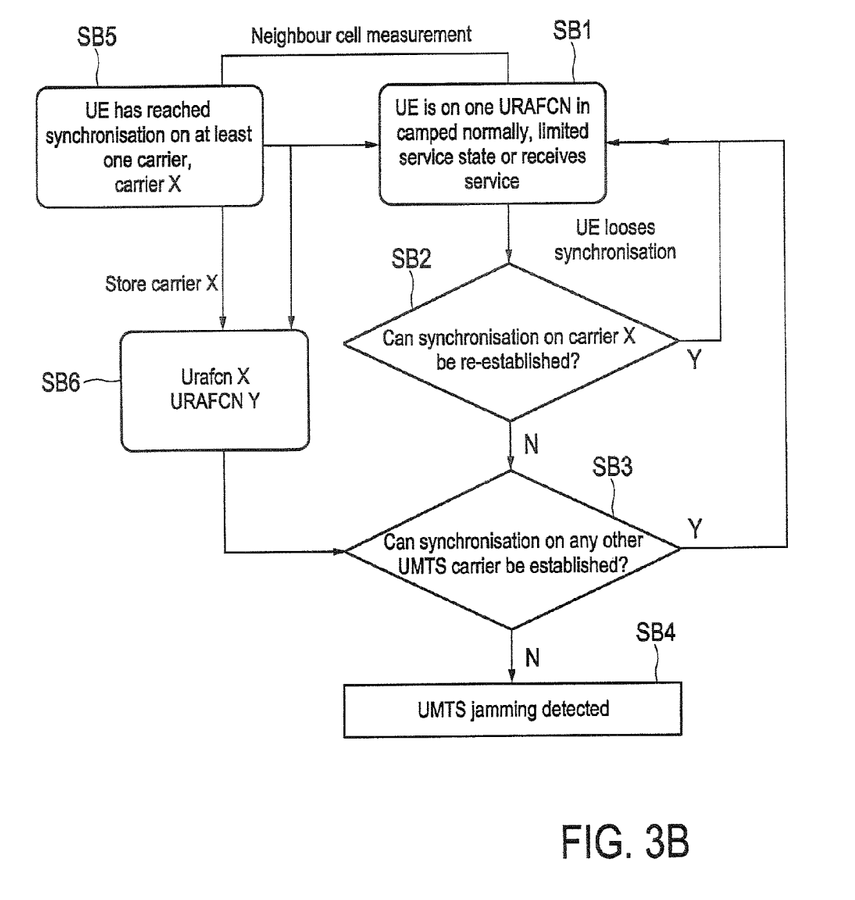

The flow chart of FIG. 3B illustrates a further preferred embodiment of the method as defined above. The method of detecting a jamming transmitter affecting a communication user equipment as for instance a jamming transmitter J in FIG. 1 affecting a user equipment UE is based on the provision that a pseudonoise spread code SC for spreading a communication signal unit SU and a synchronization of the user equipment UE to a cell of the cellular radio network RN has been determined during a cell search from a synchronization channel. Thus, as shown in step SB1 of the method, the user equipment UE is camped on one dedicated channel having a frequency channel number FCN of a universal radio access network URAFCN. Due to a jamming affection of the communication user equipment the user equipment UE will only receive a limited service state and finally the user equipment UE will loose synchronization.

Due to the jamming energy in the channel with URAFCN, nevertheless the user equipment will try to refine a CPICH, i. e. the user equipment UE will try to receive a spreading code as shown in FIG. 1. Introducing, however, is a cell search mechanism wherein a slot synchronization, a frame synchronization and finally a code group identification will take place and further a spreading code identification is achieved as outlined above. Step SB2 summaries the above-mentioned step Step 1, Step 2 and Step 3 of a synchronization process. In step SB2 it will be decided whether a synchronization on the formerly available carrier X in the cell can be re-established YES or if a re-establishment is not possible NO. Thus, the result will be given as a result of a Boolean operation with only two values, namely YES or NO without any measurement of power level or the like. In the YES-path the process following step SB2 will lead back to the status of the user equipment as shown in step SB1.

In the NO-path a further Boolean operation as in step SB3 follows wherein the cell search mechanism as outlined above will be carried out on any other UMTS carrier; thus in particular it is verified whether a synchronization on any other UMTS carrier can be established. The result of this Boolean operation in the YES-path will lead to the status of the user equipment as shown in step SB1. In the NO-path a Boolean value can be outputted indicating that neither synchronization on the previous carrier X nor any other UMTS carrier could be established.

Also, additionally in FIG. 3 it is possible that in step SB3 a number of carriers, namely URAFCN X and Y are checked for synchronization wherein the carriers X, Y are stored in a memory as shown in step SB6. A storage of carriers can be achieved once the user equipment is normally camped on a URAFCN of that carrier as shown in step SB5. Thus, step SB3 can be executed more quickly and possibly if it can be restricted to checking only those URAFCN, which have been stored in step SB6.

Following the NO-path from step SB3 in step SB4 it is indicated to an application layer that the user equipment is affected by a jamming transmitter.

In particular the same measurement with step SB1 to SB6 can be repeated in an instant cell and the cell search also can be extended to neighbouring cells by measuring synchronizing channels of neighbouring cells. This further process is indicated in step SB7 of FIG. 3B.

Not shown here, but additionally, a further condition can be verified in combination with steps SB2 and SB3, namely that the power indicator is indicative of a received radio signal strength RTWP exceeding a noise level. However, this step is not obligatory in the instant case as the method starts from a situation wherein the user equipment is camped normally on an URAFCN. Thus, while checking synchronization on the previous carrier X in step SB2 it is made sure that a synchronization channel cannot be received for a communication frequency channel wherein a synchronization channel indeed has been received before the verifying step for that communication frequency channel.

Figure 4:
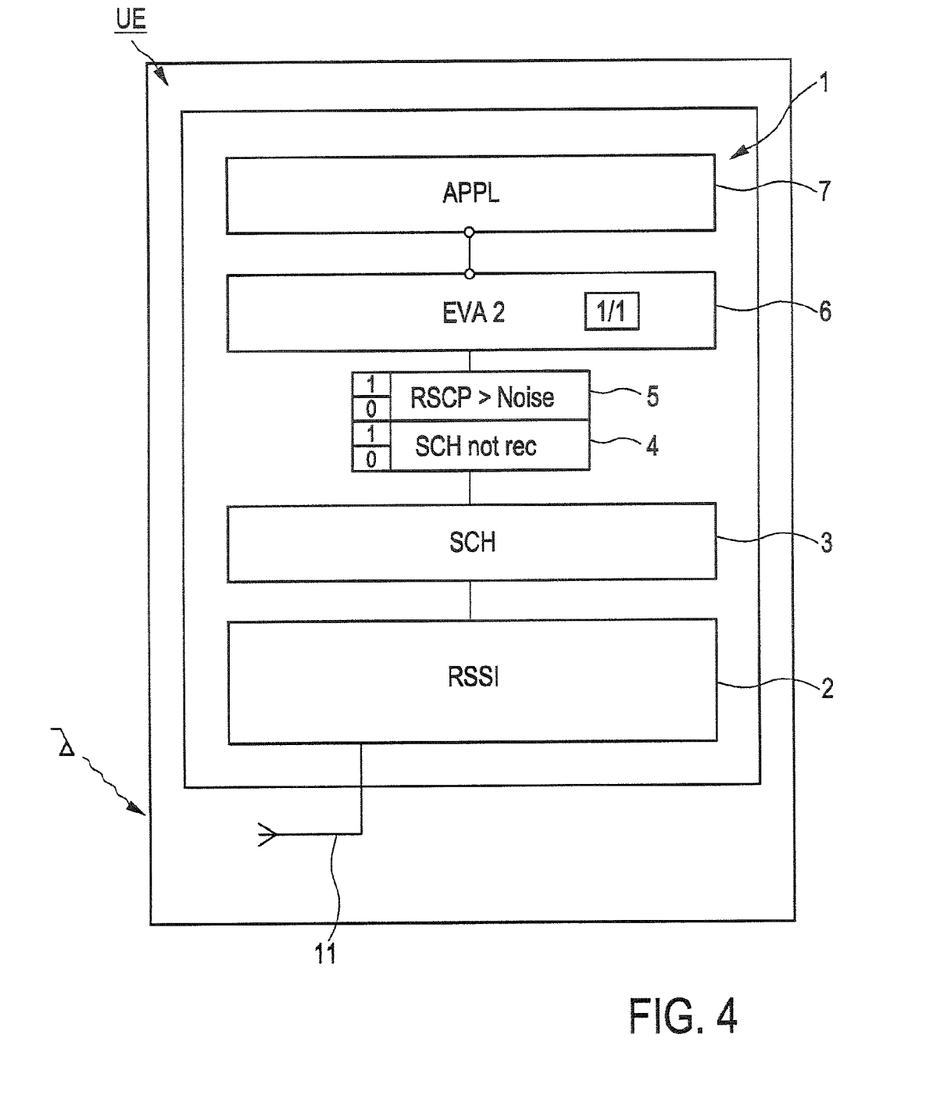
FIG. 4 shows a preferred embodiment of a user equipment adapted to execute the method of detecting a jamming transmitter affecting the communication user equipment as shown in FIG. 1.

FIG. 4 shows a user equipment UE wherein a communication module 1 is provided with an antenna 11. Thus, for instance a received wide band radio signal strength RTWP can be measured by a power indicator 2 RSSI of the communication module 1. In the present case the power indicator 2 will provide an RSSI or other power indicator taking into account not only the usually network signal strength, but also a jamming signal strength J. Further, a synchronization module 3 for a cell search is shown wherein a slot synchronization, frames synchronization and code group identification and spreading code identification as outlined in the above-mentioned Step 1, Step 2 and Step 3 can be executed.

Further, the communication module 1 has a first Boolean output 4 outputting the value "1" in the case a synchronization channel SCH is not received and outputting the value "0" in the case a synchronization channel SCH is received. A further Boolean value output 5 is provided wherein a Boolean value "1" is outputted in the case a received RSSI exceeds a noise level and outputting the Boolean value "0" if that is not the case. In the Boolean evaluation unit 6 indication of a jamming transmitter is provided only for existing Boolean values "1" and "1" from outputs 4 and 5.

Thus, in case the Boolean evaluation unit receives two Boolean values "1" an indication to the application layer 7 is provided wherein a jamming transmitter affecting the communication user equipment UE is identified. The evaluation unit 6 is adapted to receive a determined power indicator and a determination of a synchronization channel in form of the two Boolean values. In the Boolean evaluation unit 6 it can be verified that (a) the power indicator is indicative of a received radio signal strength exceeding the noise level (Boolean value "1") and (a) the synchronization channel SCH can not be received (Book can value "1").

The invention claimed is:
1. A method of detecting a jamming transmitter, affecting a communication user equipment, wherein
said communication user equipment is configured for communication with a component of a cellular code division multiple access based radio network having a number of user equipments and a number of base node stations, and
wherein the cellular radio network provides a synchronization channel for synchronization of the user equipment to a base node of the cellular radio network,
wherein the method comprises the steps of:
indicating that the communication user equipment is capable of communicating in the cellular radio network by means of a communication indicator indicating at least one of:
a) the communication user equipment is in a cellular code division multiple access based radio network coverage area, and
b) the communication user equipment has camped on a cell of a cellular code division multiple access based radio network;

testing a match of a uniform synchronization signal sequence of the synchronization channel for detecting the synchronization channel wherein the synchronization channel is a primary synchronization channel for identifying onset of a radio frame, and wherein a matching filter for a uniform synchronization signal sequence of the primary synchronization channel is provided;

detecting a power indicator indicative of an unbiased wide band power of a received radio signal strength and comparing the power indicator to a noise floor threshold; and indicating a jamming affection of the communication user equipment when
the communication indicator is set, and
the uniform synchronization signal sequence of the synchronization channel is not matched in the test, and
the power indicator exceeds the noise floor threshold.

2. The method according to claim 1 wherein the user equipment is synchronized to a cell of the cellular radio network, in the case where the synchronization channel is detected.

3. The method according to claim 1 wherein an indication of a jamming affection of the communication user equipment is suppressed, in the case where the communication user equipment is capable of communicating in a cellular radio network other than a cellular code division multiple access based radio network.

4. The method according to claim 1 wherein the communication indication comprises indicating a uniform synchronization signal sequence of the synchronization channel for each of a number of UTRA carrier frequencies.

5. The method according to claim 1 wherein the test comprises a predetermined number of matching attempts for a sequence of radio frames and wherein the uniform synchronization signal sequence is not matched in the test when a coherent average of the matching attempts is not matched.

6. The method according to claim 1 wherein the synchronization channel cannot be received in the case where three synchronization channel peaks repeatedly cannot be detected from a primary synchronization channel, wherein the synchronization channel peaks each have a distance of 2560 chips+/−0.5 chips.

7. The method according to claim 1 wherein availability of a maximum path signal is identified by checking an SCH-Ec/Io-parameter and the match of a uniform synchronization signal sequence of the synchronization channel for detecting of the synchronization channel is tested with a maximum path synchronization signal sequence.

8. The method according to claim 1 wherein the communication indication is user defined, and/or wherein the communication indication is automatically defined, and/or wherein the communication indication is application defined.

9. The method according to claim 1 wherein in a first earlier term, the following steps are executed:
detecting a synchronization channel for synchronization of the user equipment to a cell of the cellular radio network during a cell search by matching of the uniform synchronization signal sequence,
receiving a pseudonoise spread code for spreading a communication signal unit,
communicating in a cellular code division multiple access based radio network; and
wherein
indicating that the communication user equipment is capable of communicating in a cellular code division multiple access based radio network, comprises one or more of:
indicating that a synchronization channel has been detected,
indicating that a pseudonoise spread code has been received,
indicating that a communication has been performed.

10. The method according to claim 9 wherein in a second later term of time the following steps are executed:
testing a match of a uniform synchronization signal sequence of the synchronization channel for detecting the synchronization channel;
detecting a power indicator indicative of an unbiased wide band power of a received radio signal strength and comparing the power indicator to a noise floor threshold.

11. A device of a communication user equipment, configured to execute the method of detecting a jamming affecting the communication user equipment as claimed in claim 1, wherein the device has a power indicator detection unit, a matching filter for a uniform synchronization signal sequence of the synchronization channel and setting unit for setting the communication indicator.

* * * * *